W. HOFFMANN.
FENDER.
APPLICATION FILED APR. 26, 1915.
1,168,213.
Patented Jan. 11, 1916.
2 SHEETS—SHEET 2.
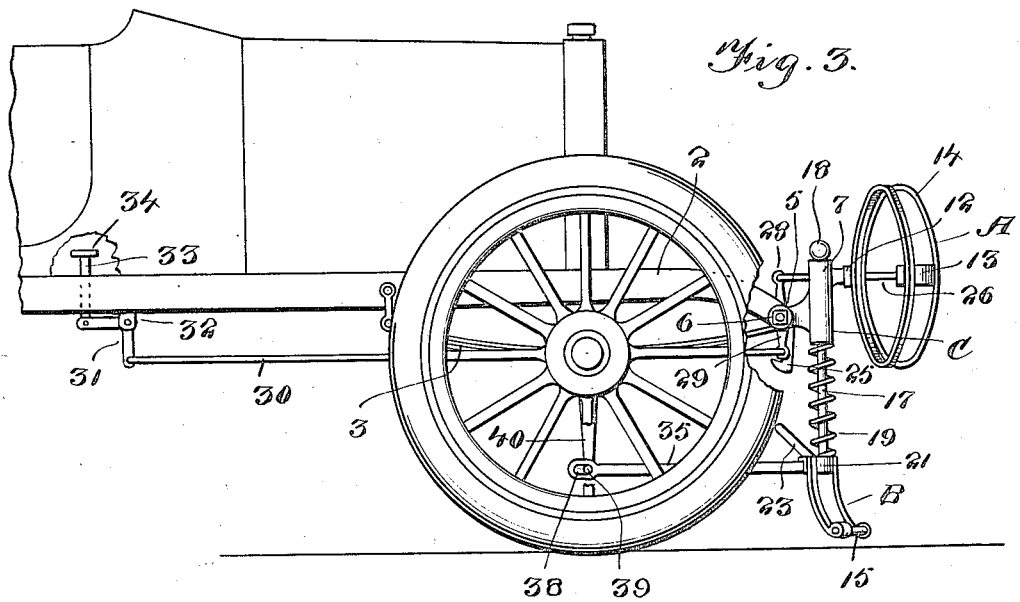
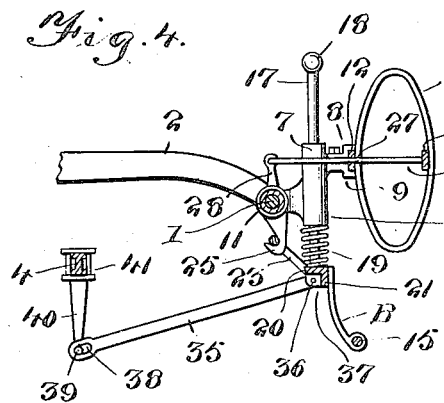
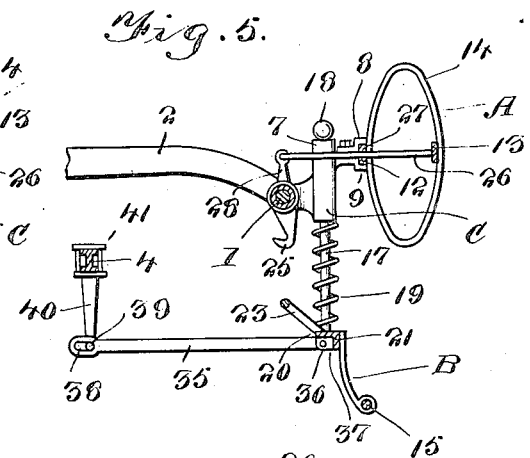
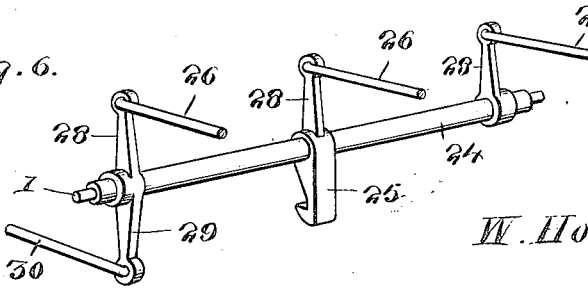
Inventor
W. Hoffmann
Witnesses
By Victor J. Evans
Attorney

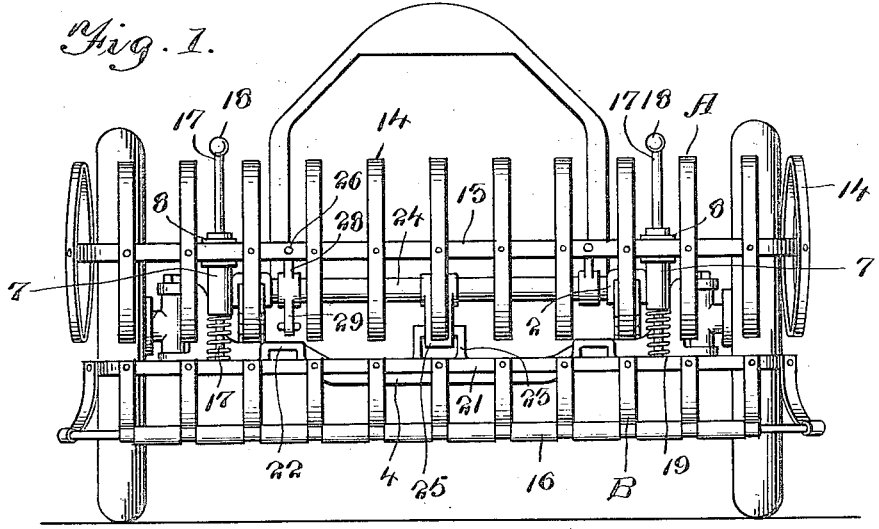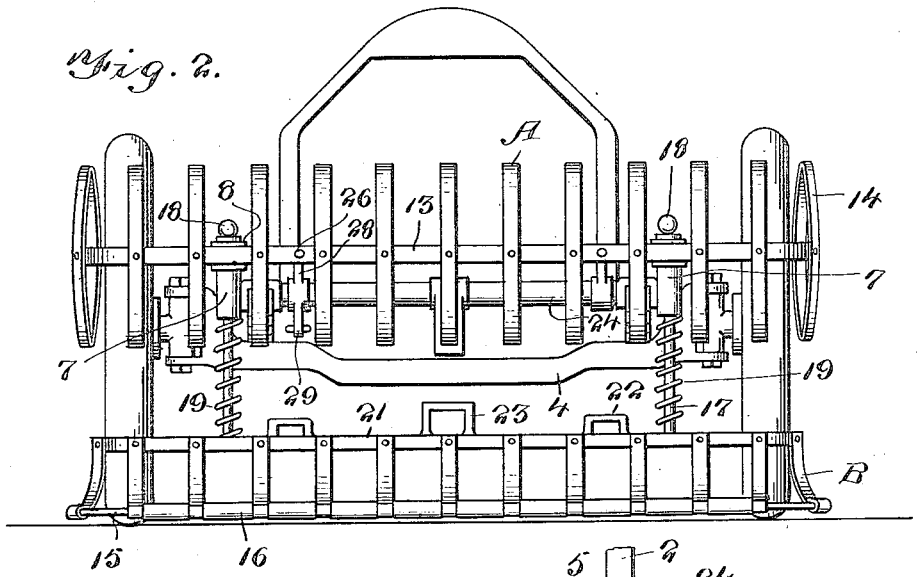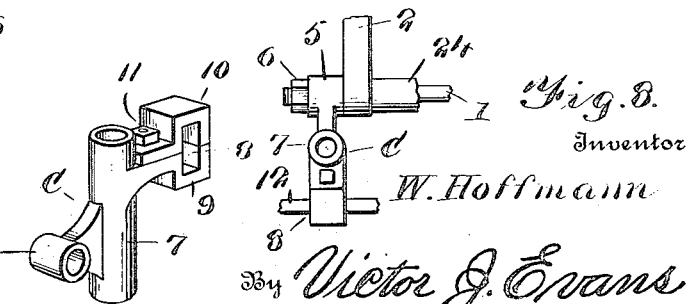

UNITED STATES PATENT OFFICE.

WLADIMIR HOFFMANN, OF CHICAGO, ILLINOIS.

FENDER.

1,168,213.  Specification of Letters Patent.  Patented Jan. 11, 1916.

Application filed April 26, 1915. Serial No. 23,912.

*To all whom it may concern:*

Be it known that I, WLADIMIR HOFFMANN, a subject of the Czar of Russia, residing at Chicago, in the county of Cook and State of Illinois, have invented new and useful Improvements in Fenders, of which the following is a specification.

This invention relates to fenders especially designed for use upon automobiles and other motor driven vehicles, the broad object of the invention being to produce an efficient and life-saving fender embodying in connection with a resilient upper impact section, a lower drop section constituting a wheel guard and also a guard for the under structure of an automobile, the said drop fender section being upheld at a suitable elevation to normally give ample road clearance, the said drop section of the fender being so mounted and controlled that it may either be tripped automatically when the fender comes into contact with a person or object or it may be tripped by the operator or driver of the machine.

With the above and other objects in view, the invention consists in the novel construction, combination and arrangement of parts, as herein described, illustrated and claimed.

In the accompanying drawings:—Figure 1 is a front elevation of a fender embodying the present invention and shown applied to an automobile and illustrating the drop fender in its raised position. Fig. 2 is a similar view showing the drop fender section depressed. Fig. 3 is a side elevation of the same with the parts arranged as shown in Fig. 2. Fig. 4 is a fore and aft vertical section, showing the tripping means for the drop fender section. Fig. 5 is a similar section showing the drop fender section in its depressed position. Fig. 6 is a detail perspective view of the trip shaft and its attachments. Fig. 7 is a detail perspective view of one of the fender supporting brackets. Fig. 8 is a fragmentary front elevation of the same showing its connection with the frame of the vehicle.

The fender contemplated in this invention comprises an upper resilient section designated generally at A and a depressible or drop fender section designated generally at B and serving as a wheel guard as well as a guard for the under structure of the machine upon which it is mounted, preventing persons or objects from getting beneath the wheels and car so as to be injured thereby.

In order to mount the fender upon an automobile or motor car, I employ a shackle rod 1 which takes the place of the usual shackle bolts connecting the side bars 2 of the frame or chassis of the machine with the front body-supporting springs 3, the latter being secured to the front axle 4 in the usual manner.

Mounted upon the ends of the shackle rod 1 are two fender supporting brackets each of which is designated generally at C, each bracket comprising an eye or sleeve portion 5 which receives the rod 1 and is held in fixed relation to the frame of the machine by a clamping nut 6 or the equivalent thereof. Each bracket also comprises a vertical tubular guide portion 7 the purpose of which will hereinafter appear, and a split holder or clamp 8 embodying a section 9 which is preferably formed integrally with the bracket C, and a detachable portion 10 which is secured to the fixed portion 9 by means of a bolt 11 or its equivalent.

The upper fender section A embodies a rearwardly disposed horizontal bar 12 and a forwardly disposed impact bar 13, the said bars 12 and 13 being connected by means of a series of substantially elliptical springs 14 which act as buffer springs to impart a yielding blow to any person or object struck by the fender and which also provide for the movement of the impact bar rearwardly toward the stationary horizontal bar 12 for the purpose of tripping and releasing the drop fender section as will hereinafter appear.

The drop fender section B is of open skeleton or reticulated form as shown and in the preferred embodiment thereof, the bottom bar 15 thereof is provided with a plurality of rollers 16 adapted to contact with the road surface and by rolling thereon prevent injury to the fender in case the drop fender section is depressed far enough to come into contact with such road surface. Ordinarily, however, the downward movement of the fender section B will be limited so as to prevent it from reaching the road surface by the means to be now described. Extending upwardly from the fender section B are rods or stems 17 which are slidable through the guides 7 of the supporting brackets C, each of said rods or stems 17 being provided at its upper extremity with a head 18 which forms a stop coacting with the guide 7 to limit the downward movement of the fender section B. A helical expansion spring 19 encircles each of the rods or stems 17 and is interposed between the bottom end of the guide 7 and a shoulder 20 of the fender section B. The last named fender section, in the preferred embodiment thereof also comprises a top bar or rail 21 provided with one or more lifting handles 22 to enable the operator to lift the section B after it has been tripped and released and depressed by the action of the springs 19. In addition to the handles 22, the bar 21 is provided with a centrally arranged keeper 23 the purpose of which will presently appear.

A tubular trip shaft 24 surrounds the shackle rod hereinabove described and is interposed between the side bars 2 of the machine frame and adapted to turn on said shackle rod. Centrally the trip shaft 24 is provided with a hook 25 adapted to engage the keeper 23 of the fender section B in order to support or uphold said fender section at the upper limit of its movement. Fastened to the impact bar 13 is a plurality of plungers or push rods 26 which extend through guide holes 27 in the stationary horizontal bar 12 and connect pivotally at their rear extremities to a corresponding number of arms 28 having a fixed relation to the trip shaft 24, the arrangement being such that when the impact bar 13 strikes a person or object, the plungers or push rods 26 are thrust rearwardly, thereby acting on the arms 28 to rock the trip shaft 24 and disengage the hook 25 from the keeper 23, whereupon the fender section B is thrust downwardly by the action of the expansion springs. The central arm 28 is preferably formed integrally with the hook 23 as shown in Fig. 8. One of the end arms 28 is also by preference formed integrally with an oppositely extending arm 29 from which a rod 30 extends rearwardly to a bell crank lever 31 pivotally mounted on a bracket 32 connected to the body of the car and shown as fastened to the bottom of the platform or frame of the car, 33 designating a rod connected to one arm of said bell crank lever and extending upwardly to within reach of the operator's foot where said rod is provided with a pedal 34, by the depression of which the driver or operator of the car may rock the shaft 24 and release the drop fender section when he realizes that the machine is about to come in contact with a person or object. Thus the drop fender may be tripped automatically by impact with a person or object or manually by the operator or driver of the machine.

Connected to the fender section B adjacent to the opposite sides of the car are thrust sustaining links 35. These links are pivotally connected at 36 to lugs 37 on the fender section B and are provided at their rear ends with longitudinal slots 38 which receive stop pins or studs 39 on a pair of arms 40 provided with sleeves or eyes 41 to receive the front axle 4 of the machine upon which they are rigidly fastened. When the fender section B is raised and engaged by the hook 25, the pins 39 are in the rear ends of the slots 38. When the fender section B is depressed to the limit of its movement, the pins 39 occupy the forward extremities of the slots 38 as shown in Fig. 6 and therefore the links 35 act as braces to resist any rearward thrust on the fender section B.

In the preferred embodiment of this invention, the end portions of the sections A and B of the fender are curved or deflected rearwardly as shown, enabling the fender to brush aside persons or objects immediately adjacent to the side lines of the car.

It will, of course, be understood that the construction hereinabove described is susceptible of changes in the form, proportion and minor details and that the same may accordingly be resorted to without departing from the principle or sacrificing any of the advantages of the invention.

What I claim is:—

1. In a fender for automobiles, the combination of a shackle rod passing through both knuckles at the forward joints between the chassis and front body-supporting springs, a tubular trip shaft mounted to turn on said rod, fender supporting brackets held by said rod in fixed relation to the chassis, an upper resilient fender section supported by said brackets, means actuated by said upper fender section for rocking said trip shaft, a lower drop fender section guided and supported by said brackets, and means whereby said drop fender section may be upheld and released by said trip shaft.

2. In a fender for automobiles, the combination of a shackle rod passing through both knuckles at the forward joints between the chassis and front body-supporting springs, a tubular trip shaft mounted to turn on said rod, fender supporting brackets held by said rod in fixed relation to the chassis, an upper resilient fender section supported by said brackets, means actuated by said upper fender section for rocking said trip shaft, a lower spring depressed drop fender section guided and supported by said brackets, and means whereby said drop fender section may be upheld and released by said trip shaft.

3. In a fender for automobiles, the combination of a shackle rod passing through both knuckles at the forward joints between the chassis and front body-supporting springs, a tubular trip shaft mounted to turn on said rod, fender supporting brackets held by said rod in fixed relation to the chassis, an upper resilient fender section supported by said brackets, means actuated by said upper fender section for rocking said trip shaft, a lower drop fender section guided and supported by said brackets, and coöperating members on said trip shaft and drop fender section whereby said drop fender section may be upheld and released by said trip shaft.

4. In a fender for automobiles, the combination of a shackle rod passing through both knuckles at the forward joints between the chassis and front body-supporting springs, a tubular trip shaft mounted to turn on said rod, fender supporting brackets held by said rod in fixed relation to the chassis, an upper resilient fender section supported by said brackets and embodying a spring sustained impact bar, means actuated by said impact bar for rocking said trip shaft, a lower drop fender section guided and supported by said brackets, and means whereby said drop fender section may be upheld and released by said trip shaft.

5. In a fender for automobiles, the combination of a shackle rod passing through both knuckles at the forward joints between the chassis and front body-supporting springs, a tubular trip shaft mounted to turn on said rod, fender supporting brackets held by said rod in fixed relation to the chassis, an upper resilient fender section supported by said brackets, means actuated by said upper fender section for rocking said trip shaft, a lower drop fender section guided and supported by said brackets, means whereby said drop fender section may be upheld and released by said trip shaft, and links permitting said drop fender section to move downwardly and also acting as thrust resisting elements for said drop fender section when depressed.

6. In a fender for automobiles, the combination of a shackle rod passing through both knuckles at the forward joints between the chassis and front body-supporting springs, a tubular trip shaft mounted to turn on said rod, fender supporting brackets held by said rod in fixed relation to the chassis, an upper resilient fender section supported by said brackets and embodying a stationary horizontal bar, an impact bar in advance thereof and parallel thereto, substantially vertical and elliptical springs connecting said stationary and impact bars, means actuated by said upper fender section for rocking said trip shaft, a lower drop fender section guided and supported by said brackets, and means whereby said drop fender section may be upheld and released by said trip shaft.

7. In a fender for automobiles, the combination of a shackle rod passing through both knuckles at the forward joints between the chassis and front body-supporting springs, a tubular trip shaft mounted to turn on said rod, fender supporting brackets held by said rod in fixed relation to the chassis, an upper resilient fender section supported by said brackets, means actuated by said upper fender section for rocking said trip shaft, a lower drop fender section guided and supported by said brackets, means whereby said drop fender section may be upheld and released by said trip shaft, and manually controlled means for operating said trip shaft.

In testimony whereof I affix my signature in presence of two witnesses.

WLADIMIR HOFFMANN.

Witnesses:
DANIEL ROSZCZEWSKI,
STEFAN KAMINSKI.